United States Patent
Yu

(10) Patent No.: US 10,518,434 B2
(45) Date of Patent: Dec. 31, 2019

(54) STRUCTURE OF POWER CARPENTRY FEEDER MACHINE

(71) Applicant: Ben Yu, Taichung (TW)

(72) Inventor: Ben Yu, Taichung (TW)

( * ) Notice: Subject to any disclaimer, the term of this patent is extended or adjusted under 35 U.S.C. 154(b) by 208 days.

(21) Appl. No.: 15/863,976

(22) Filed: Jan. 7, 2018

(65) Prior Publication Data

US 2019/0210243 A1 Jul. 11, 2019

(51) Int. Cl.
| B27C 1/12 | (2006.01) |
| B27C 5/02 | (2006.01) |
| B27C 5/04 | (2006.01) |
| B27C 5/08 | (2006.01) |
| B27C 5/06 | (2006.01) |

(52) U.S. Cl.
CPC ............... B27C 1/12 (2013.01); B27C 5/02 (2013.01); B27C 5/04 (2013.01); B27C 5/06 (2013.01); B27C 5/08 (2013.01)

(58) Field of Classification Search
CPC .... B27C 1/12; B27C 5/08; B27C 5/02; B27C 5/04; B27C 5/06
See application file for complete search history.

(56) References Cited

U.S. PATENT DOCUMENTS

| 4,058,151 A * | 11/1977 | Yonezu | B27B 25/02 144/248.4 |
| 4,483,378 A * | 11/1984 | Chang | B23Q 5/385 144/136.1 |
| 7,784,505 B2 * | 8/2010 | Lin | B23D 47/045 144/242.1 |
| 9,981,404 B2 * | 5/2018 | Sung | B23D 55/046 |
| 2004/0250888 A1 * | 12/2004 | Liu | B27C 1/12 144/114.1 |
| 2013/0315692 A1 * | 11/2013 | Hsiung | B27B 25/10 414/14 |

* cited by examiner

Primary Examiner — Michael J Carey
Assistant Examiner — Dylan Schommer
(74) Attorney, Agent, or Firm — Leong C. Lei

(57) ABSTRACT

A power carpentry feeder machine includes a power source; a rotary wheel operatively coupled to the power source; horizontal guide rods horizontally coupled to the power source; a horizontal movement unit including two movable blocks having horizontal guide holes to receive the horizontal guide rods therein, locking members attached to the movable blocks, a connection block interposed between the two movable blocks and including vertical guide holes, and jointing members jointing the movable blocks to the connection block; a mounting base including a base board and vertical guide rods vertically coupled to the base board and extending through the vertical guide holes; and a vertical movement unit including springs encompassing the vertical guide rods to set the connection block under the springs and a clamp block having clamping holes to receive the vertical guide rods to extend therethrough so as to set the clamp block on the springs.

10 Claims, 14 Drawing Sheets

STRUCTURE OF POWER CARPENTRY FEEDER MACHINE

TECHNICAL FIELD OF THE INVENTION

The present invention generally relates to the field of woodworking machines, and more particularly to an improved structure of a power carpentry feeder machine.

DESCRIPTION OF THE PRIOR ART

Common woodworking machines are circular saw machines and wood planing machine. Such woodworking machines are generally operated to cut timber or for surface finishing of wood parts. The operation is generally conducted by placing a timber or a wood part on the woodworking machines and holding the timber or wood part tightly on a slidable or movable feeder plate and a user applies a force to the feeder plate such that the feeder plate carries the timber or wood part forward for feeding. Such an operation is generally carried out by human power and is thus not of high precision generally. In addition, the operator must push or pull the timber or wood part placed on the woodworking machines in order to feed the timber or wood part forward. This is of high risk and a large physical burden to the operator.

Woodworking feeder machines are also known, such as Taiwan Patent No. 1564132 and Taiwan Utility Model No. M497083, to carry out an automatic feeding operation in order to reduce the risk that an operator must take. However, such woodworking feeder machines do not have sound and stable structures and are easy to shake and vibrate during the operations thereof and thus suffering insufficiency of stability and soundness.

SUMMARY OF THE INVENTION

In view of the above, in order to improve the prior art to alleviate or remove the problems of a known feeding machine of carpentry machinery being not structurally stable and being of a narrow scope of application, the present invention provides an improved structure of a power carpentry feeder machine, which generally comprises: a power source, which supplies rotation power; a rotary wheel, which is coupled to the power source to be in operation in combination therewith; two horizontal guide rods, are arranged in a manner of being spaced from each other to couple horizontally to the power base; a horizontal movement unit, which comprises two movable blocks, two locking members, a connection block, and two jointing members, each of the movable blocks being provided with a horizontal guide hole penetrating therethrough, the horizontal guide holes of the movable blocks respectively receiving insertion and extension of the horizontal guide rods therethrough respectively, the two locking members being respectively and operatively attached to the movable blocks, the connection block being interposed between the two movable blocks, the connection block comprising two vertical guide holes penetrating therethrough, the two jointing members being respectively coupled to and jointing between the movable blocks and the connection block; a mounting base, which comprises a base board and two vertical guide rods, the two vertical guide rods being arranged in a manner of being spaced from each other to vertically couple to a top surface of the base board and extending, in a direction from a bottom side to a top side, through the vertical guide holes of the horizontal movement unit; a vertical movement unit, which comprises two springs and a clamp block, the two springs being respectively fit over and encompassing the vertical guide rods of the mounting base such that the connection block is located under the springs, the clamp block comprising two clamping holes, the two clamping holes respectively receiving insertion and extension of the vertical guide rods therethrough so that the clamp block is located above the springs; wherein the locking members are selectively releasable so that the horizontal guide holes of the movable blocks allows the power source and the rotary wheel and the horizontal guide rods to slide reciprocally along the horizontal guide holes in a horizontal direction; wherein the jointing members are selectively releasable so that the movable blocks are operable to drive the power source and the rotary wheel to rotate with respect to the connection block, and wherein the clamp block is selectively releasable so that the connection block is operable to drive the power source and the rotary wheel to slide reciprocally along the vertical guide rods in a vertical direction. The present invention involves numerous structural designs for adjustment of angular positions and locations thereof and provides an overall structure that is sound and stable during the operation thereof so that the adaptability to wood workpieces of different materials and different thicknesses is improved and smoothness and security of material feeding can be ensured.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

Figure 1:
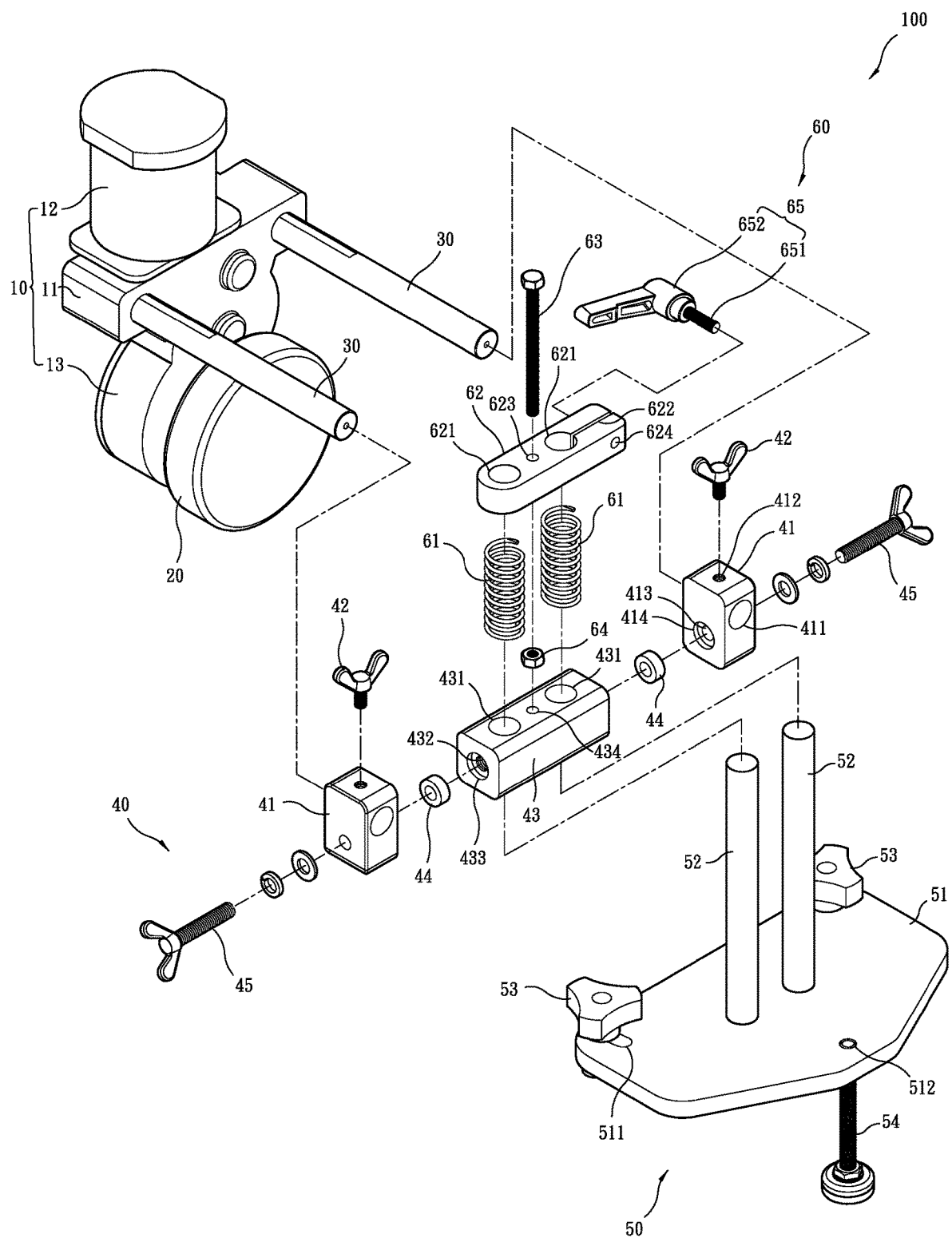
FIG. 1 is an exploded view of a preferred embodiment of the present invention.

The following descriptions are exemplary embodiments only, and are not intended to limit the scope, applicability or configuration of the invention in any way. Rather, the following description provides a convenient illustration for implementing exemplary embodiments of the invention.

Various changes to the described embodiments may be made in the function and arrangement of the elements described without departing from the scope of the invention as set forth in the appended claims.

Referring to FIGS. 1-12, a power carpentry feeder machine 100 according to a preferred embodiment of the present invention is shown, generally comprising a power source 10, a rotary wheel 20, two horizontal guide rods 30, a horizontal movement unit 40, a mounting base 50, and a vertical movement unit 60.

Figure 2:
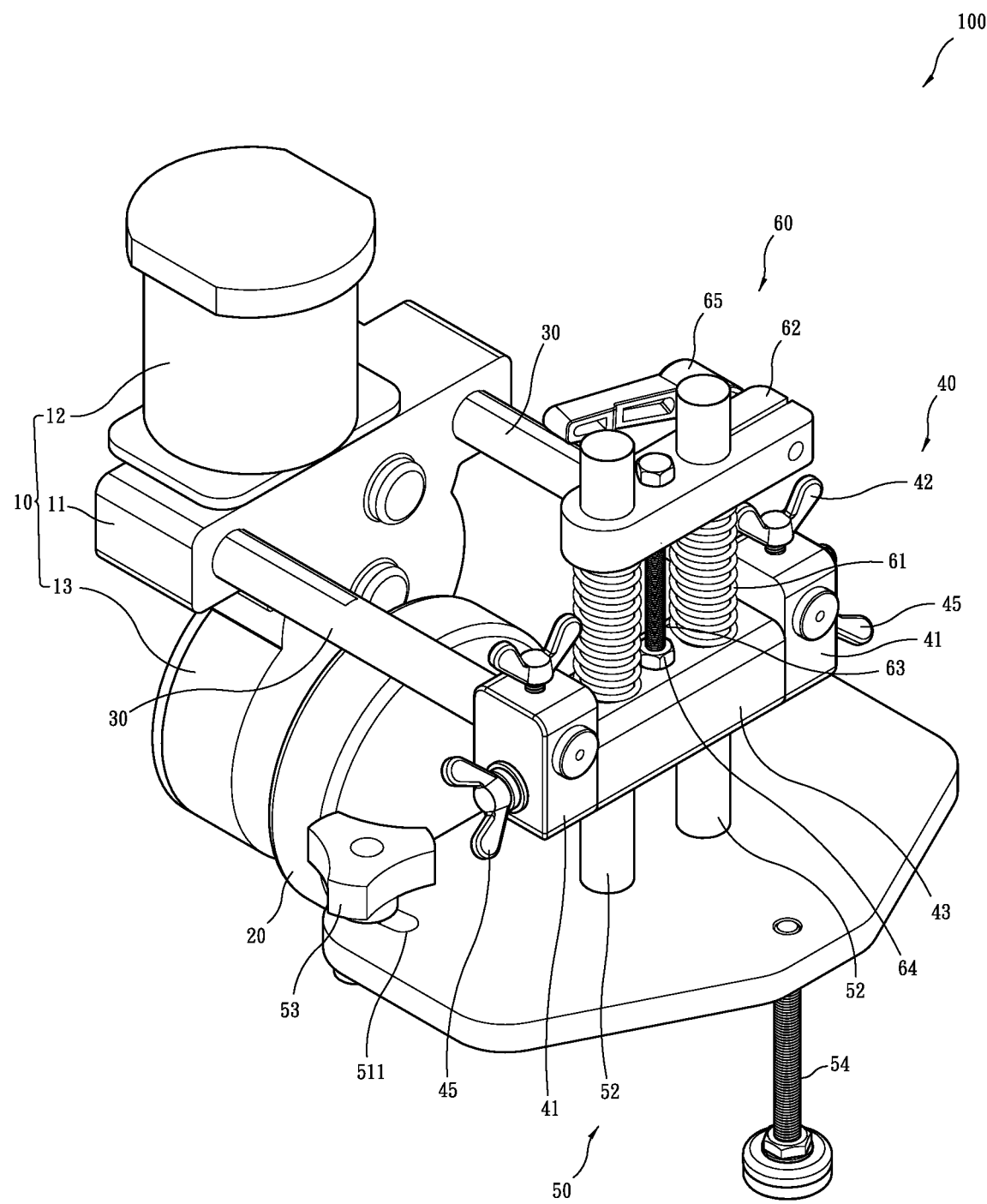
FIG. 2 is a perspective view showing the embodiment of FIG. 1 in an assembled form.

Referring to FIGS. 1 and 2, the power source 10 comprises a power base 11, a motor 12, and a gearbox 13. The motor 12 is mounted on the power base 11 to supply an output of rotation power. The gearbox 13 is mounted on the power base 11 and is coupled to the motor 12 to reduce the rotational speed of the rotation power of the motor 12 and output the reduced rotational speed.

Referring to FIGS. 1 and 2, the rotary wheel 20 is coupled to the gearbox 13 of the power source 10 to be driven by the gearbox 13 for rotation.

Referring to FIGS. 1 and 2, the two horizontal guide rods 30 are arranged in a manner of being spaced from each other to couple horizontally to the power base 11 of the power source 10.

Referring to FIGS. 1 and 2, the horizontal movement unit 40 comprises two movable blocks 41, two locking members 42, a connection block 43, two carrier rings 44, and two jointing members 45. Each of the movable blocks 41 is provided therein with a horizontal guide hole 411 penetrating therethrough, a threaded aperture 412 extending from a top surface of the movable block 41 to and in communication with the horizontal guide hole 411, a through hole 413 penetrating from inside to outside thereof, and a first counterbore 414 formed along a circumference of an inside surface of the through hole 413. The horizontal guide hole 411 of each of the movable blocks 41 receives insertion and extension of a respective one of the horizontal guide rods 30 therethrough. The two locking members 42 are each a wing screw or a thumb bolt. The two locking members 42 are respectively screwed into the threaded apertures 412 of the movable blocks 41. The connection block 43 are sandwiched and clamped between the two movable blocks 41. The connection block 43 comprises two vertical guide holes 431 penetrating therethrough, two threaded holes 432 respectively formed in two end surfaces thereof, two second counterbore 433 each formed along a circumference of an end of a respective one of the threaded holes 432, and a position-constraining threaded aperture 434 located between the two vertical guide holes 431. The two carrier rings 44 are respectively located in the second counterbores 433 formed in the two ends of the connection block 43 and the first counterbores 414 of the respective movable blocks 41. The two jointing members 45 are each a wing screw or a thumb bolt and are respectively received, from an outer side of each of the movable blocks 41, through the through holes 413 and the carrier rings 44, to get screwed into the threaded holes 432 formed in the two ends of the connection block 43.

Referring to FIGS. 1 and 2, the mounting base 50 comprises a base board 51, two vertical guide rods 52, two fixing members 53, and a support member 54. The base board 51 is provided therein with two through openings 511 and a threaded connection hole 512. The two vertical guide rods 52 are arranged in a manner of being spaced from each other to vertically couple to a top surface of the base board 51. The two fixing members 53 are each a screw extending, in a direction from a top side to a bottom side, through a respective one of the through openings 511 of the base board 51. The support member 54 is a bolt extending in a direction from the bottom side to the top side to screw into and engage with the threaded connection hole 512 of the base board 51. The two vertical guide rods 52 are arranged to extend, in a direction from the bottom side to the top side, through the vertical guide holes 431 of the connection block 43 of the horizontal movement unit 40.

Referring to FIGS. 1 and 2, the vertical movement unit 60 comprises two springs 61, a clamp block 62, a bolt 63, a nut 64, and a rotary handle 65. The two springs 61 are respectively fit over and encompass the vertical guide rods 52 of the mounting base 50 and are positioned on a top surface of the connection block 43, meaning the connection block 43 is located under the springs. The clamp block 62 comprises two clamping holes 621, a clamping slit 622 extending into and in communication with one of the clamping holes 621, an adjustment aperture 623 penetrating through top and bottom surfaces of the clamp block 62, and an adjustment threaded aperture 624 extending through the clamping slit 622. The two clamping holes 621 respectively receive insertion and extension of the vertical guide rods 52 of the mounting base 50 therethrough such that the clamp block 62 is positioned on the springs 61. The bolt 63 extends, in a direction from the top side to the bottom side, through the adjustment aperture 623 of the clamp block 62 to further extend into the position-constraining threaded aperture 434 of the horizontal movement unit 40. The nut 64 is in threading engagement with the bolt 63 and is located between the connection block 43 and the clamp block 62. The rotary handle 65 comprises a threaded bar 651 and a handgrip 652 connected to the threaded bar 651. The threaded bar 651 is set in threading engagement with and received in the adjustment threaded aperture 624 of the clamp block 62.

Figure 3:
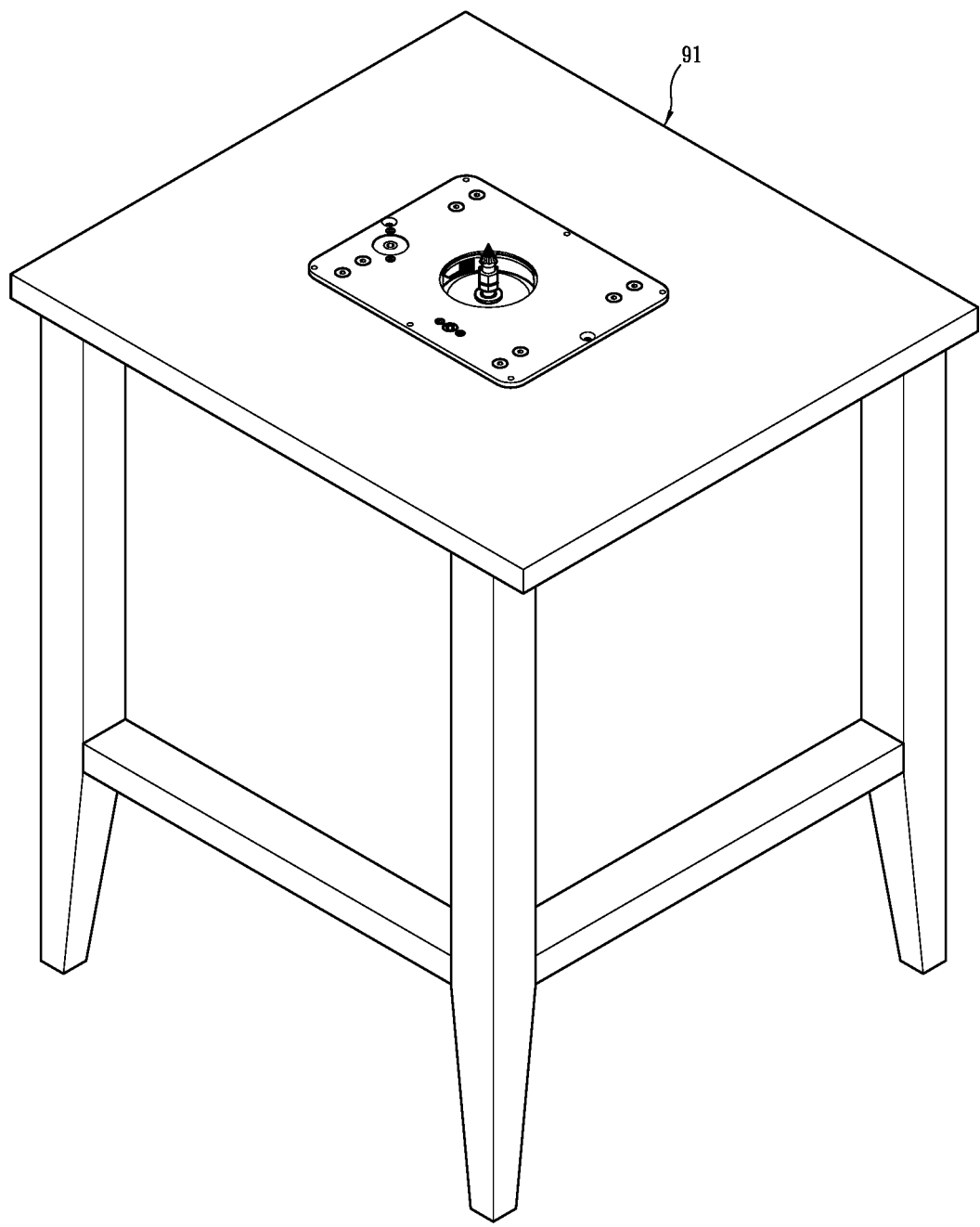
FIG. 3 is a perspective view showing a wood-planing machine.
Figure 4:
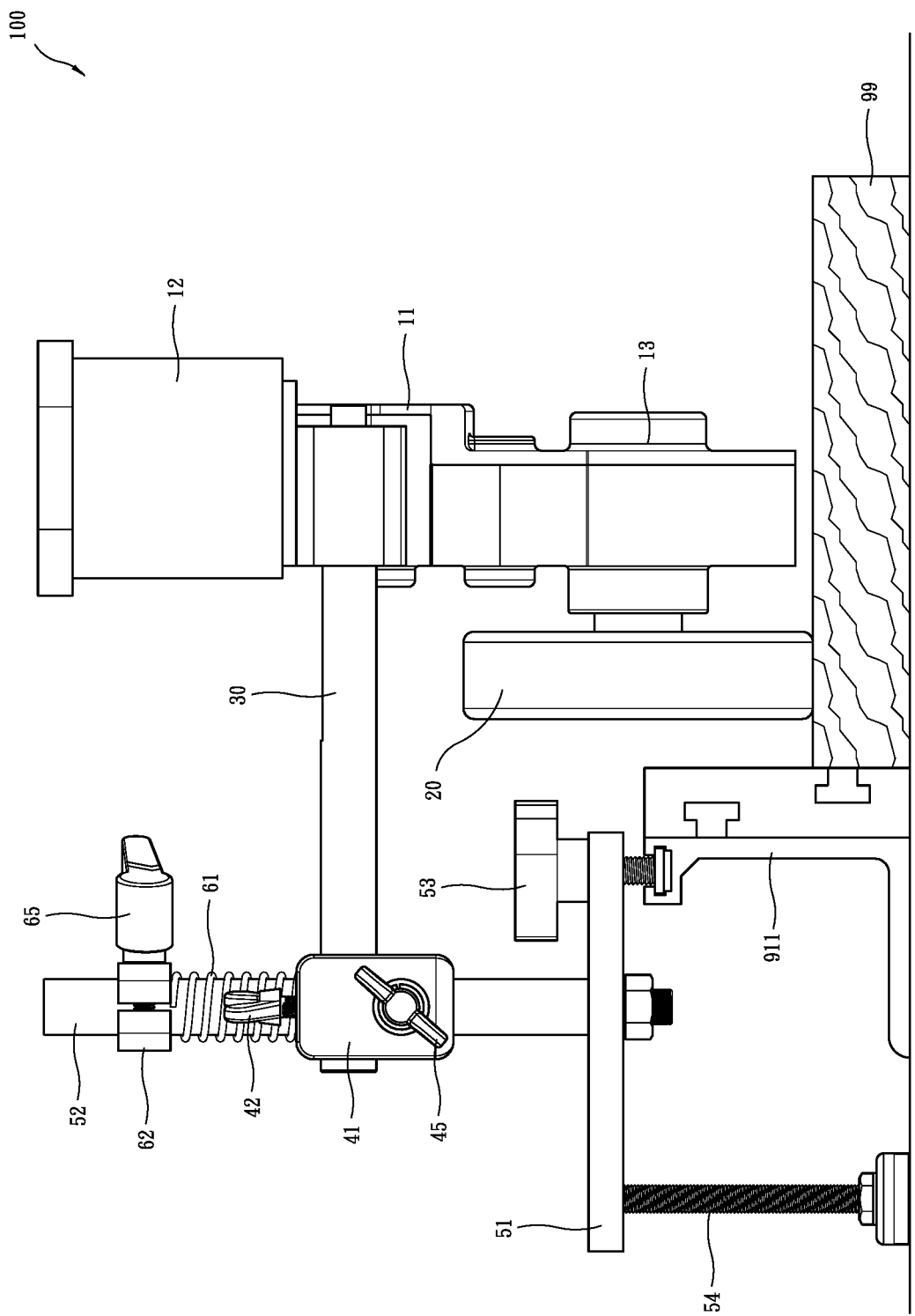
FIG. 4 is a schematic view showing a condition of operation of the embodiment of FIG. 1.

The above provides a description to each of the constituent components/parts, as well as assembly thereof, of the power carpentry feeder machine 100 of the preferred embodiment of the present invention. The features and operation of this invention will be described below:

Firstly, the present invention is installable on a wood-planing machine 91 (as shown in FIG. 3) for use and operation. To install, the fixing members 53 of the mounting base 50 are screwed into and fixed to an abutment board 911 of the wood-planing machine 91 (as shown in FIG. 4), and the support member 54 is positioned on and supported by the wood-planing machine 91 (as shown in FIG. 4) to improve structural stability.

Figure 5:
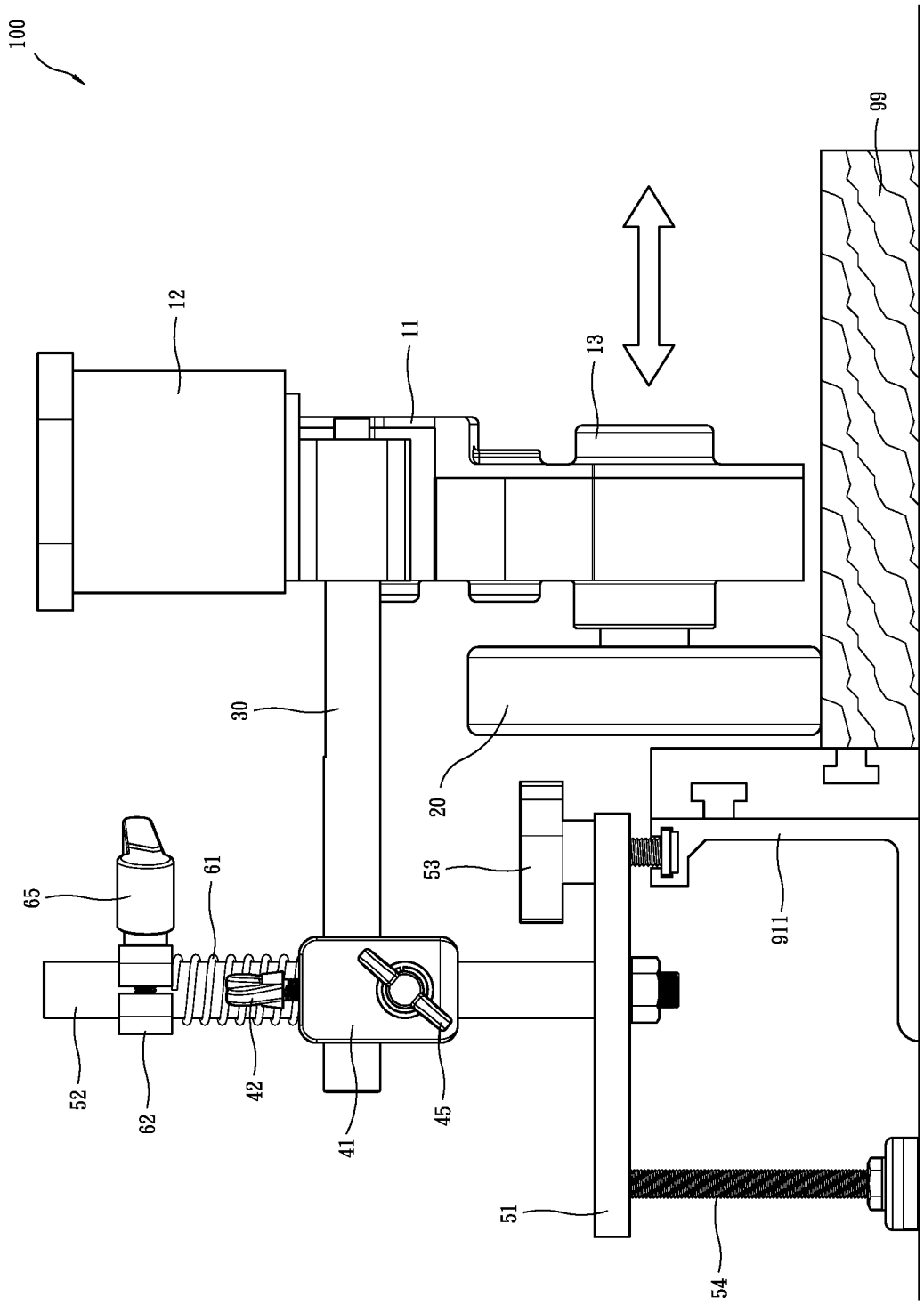
FIGS. 5-12 are schematic views showing an example of operation of the embodiment shown in FIG. 1.

Next, the locking members 42 of the horizontal movement unit 40 are partly loosened such that the locking members 42 are set in a condition of being not in physical contact with the horizontal guide rods 30 to allow for reciprocal movement of the horizontal guide rods 30 within the horizontal guide holes 411 respectively to thereby set the power source 10 and the rotary wheel 20 at a desired location through movement thereof in a horizontal direction (as shown in FIG. 5) in order to accommodate different widths of wood workpieces 99. Afterwards, the locking members 42 are tightened to securely press against the horizontal guide rods 30 thereby fixing the power source 10 and the rotary wheel 20 in position such that the rotary wheel 20 abuts and is set in physical and driving engagement with the wood workpiece 99 at a suitable portion to allow for a feeding operation to be conducted through advancing the wood workpiece 99 with the rotation of the rotary wheel 20.

Figure 6:
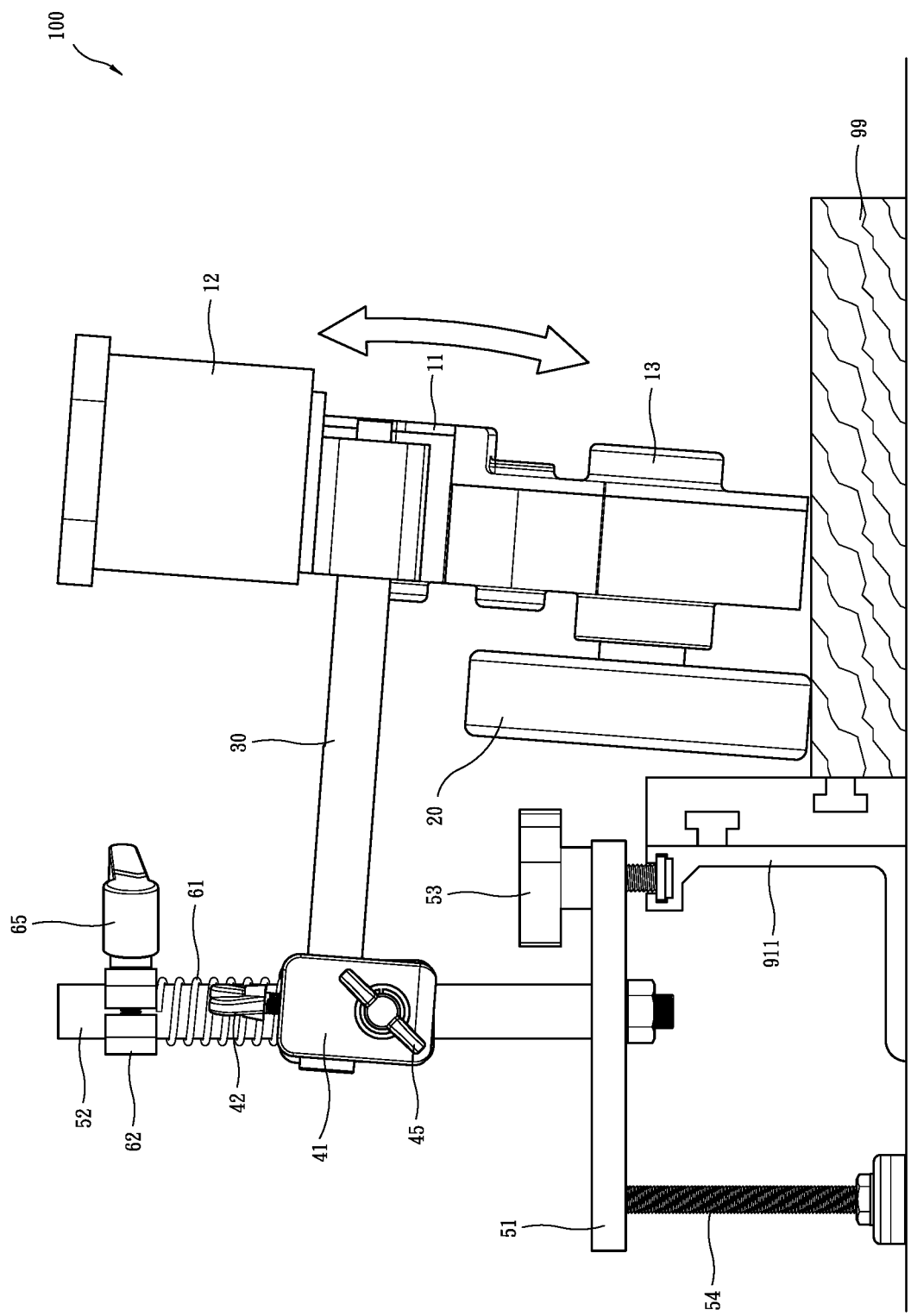

Further, the jointing members 45 of the horizontal movement unit 40 may be partly loosened to allow the two movable blocks 41 to rotate with respect to the connection block 43 such that the power source 10 and the rotary wheel 20 are adjustable in respect of an inclination angle thereof with respect to a vertical direction (as shown in FIG. 6), and afterwards, the jointing members 45 are tightened again to make the two movable blocks 41 fixed and not rotatable thereby fixing the power source 10 and the rotary wheel 20 in the angular position so set, whereby a force is applied to the wood workpiece 99 in a direction toward the abutment board 911 to make the wood workpiece 99 lie against the abutment board 911 during the advancing movement thereof and moving along the abutment board 911 so as to make the size of the wood workpiece 99 cut with the machine consistent.

Figure 7:
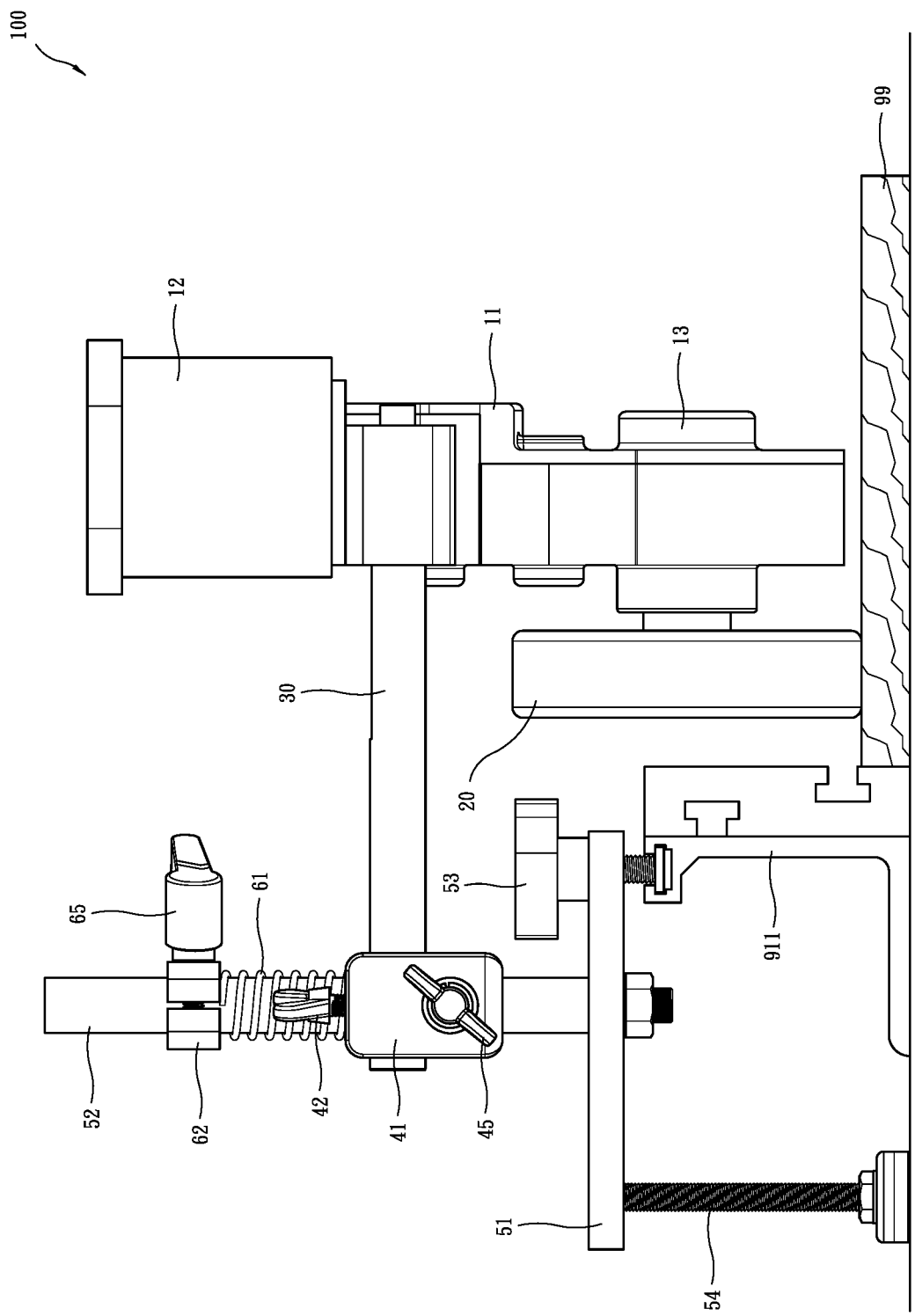
Figure 8:
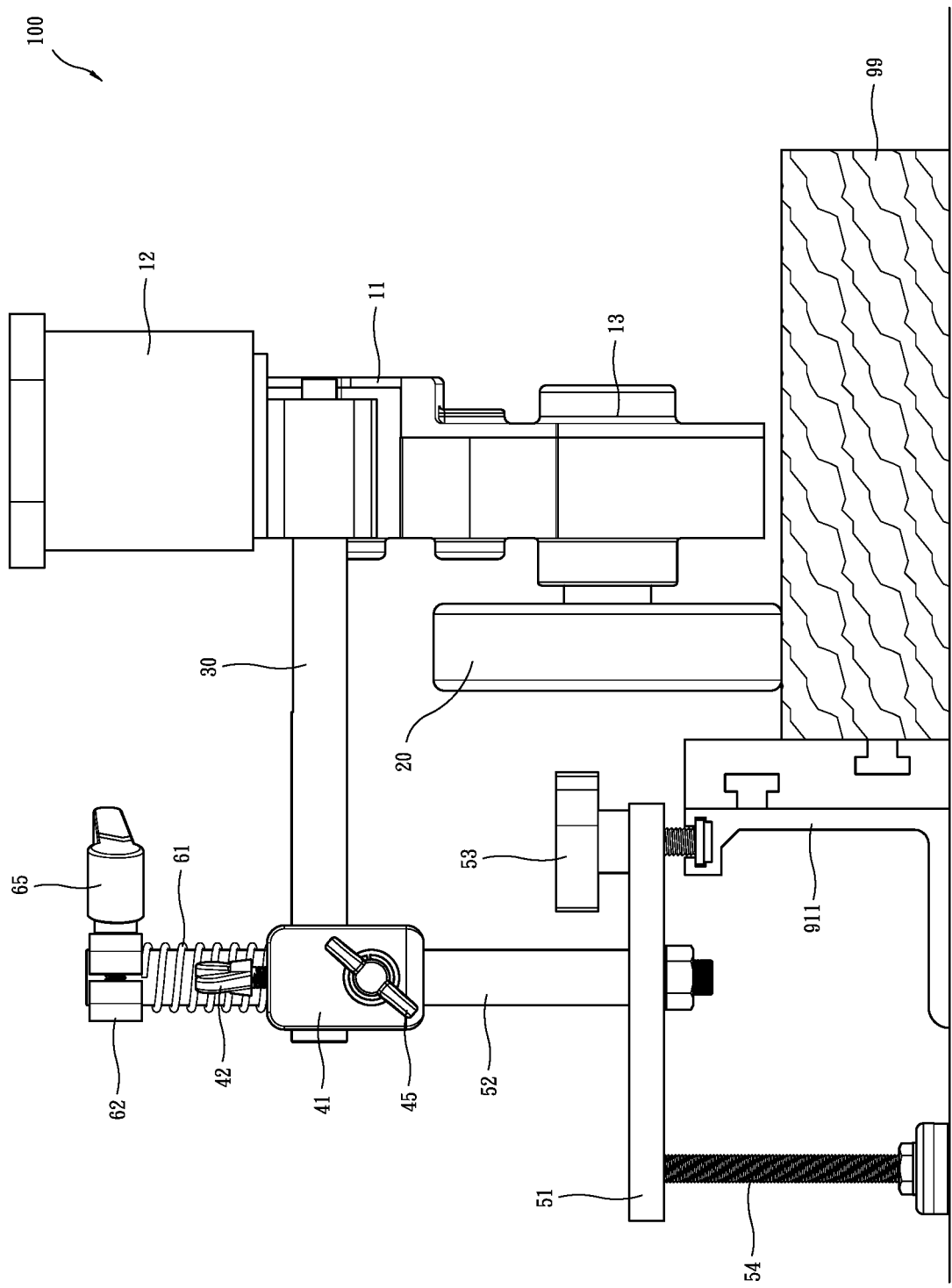

Next, in order to accommodate different heights of the wood workpiece 99, the rotary handle 65 of the vertical movement unit 60 can be rotated and loosened to allow the clamp block 62 to be movable vertically with respect to the vertical guide rods 52 in order to move the power source 10 and the rotary wheel 20 up and down for adjustment of the vertical position thereof (as shown in FIGS. 7 and 8), whereby workpieces 99 of different thicknesses can be accommodated.

Figure 9:
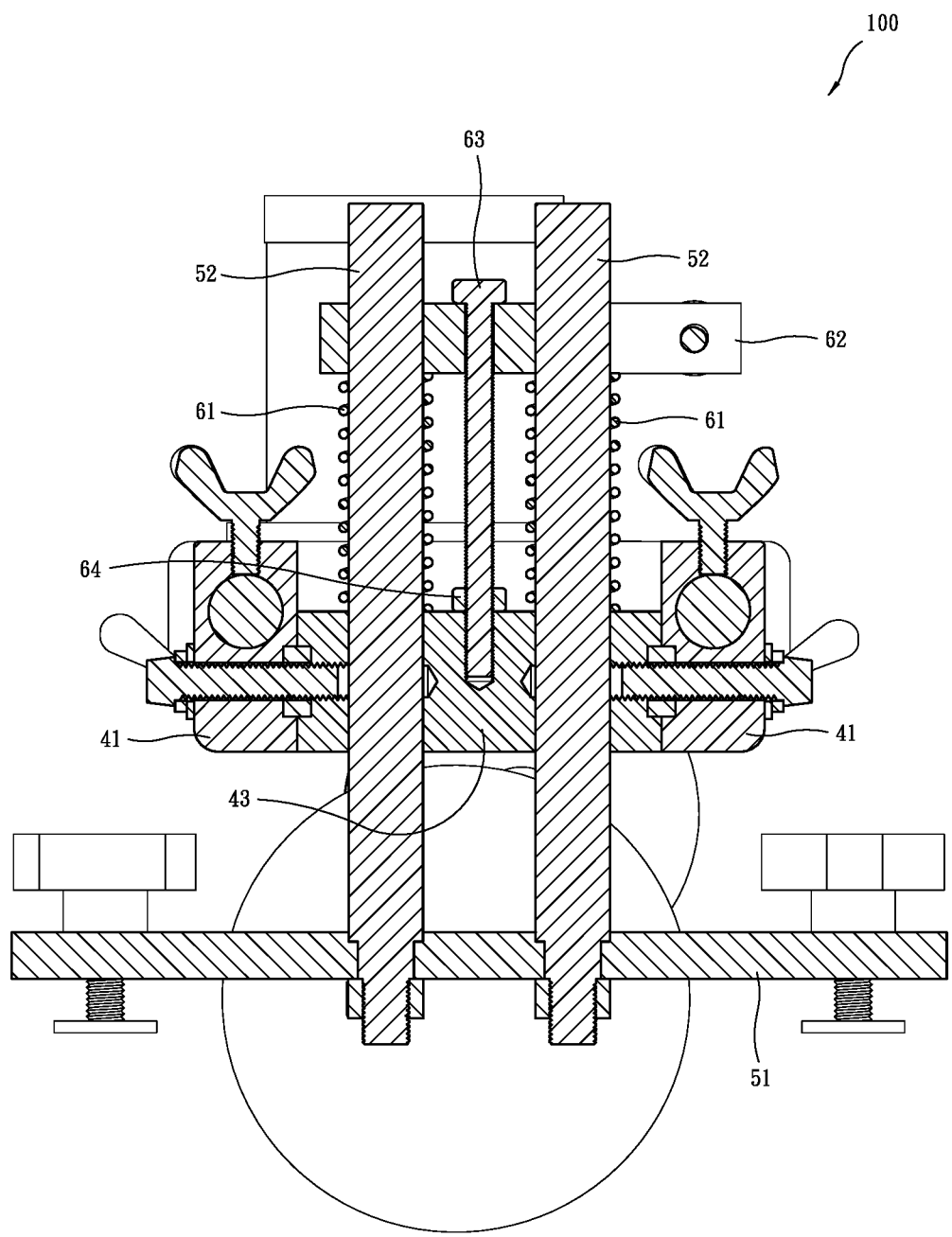
Figure 10:
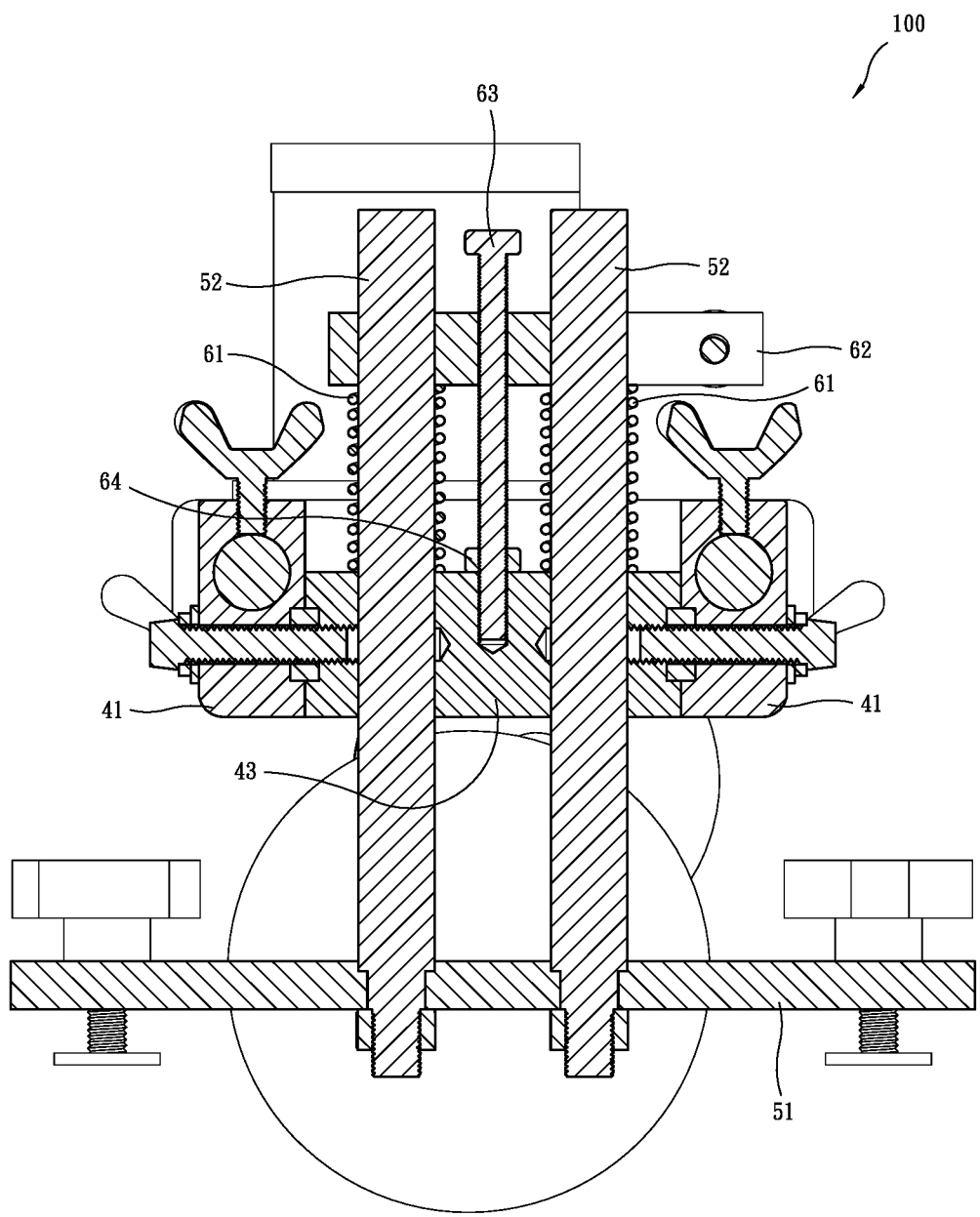

Further, through tightening or loosening the bolt 63 of the vertical movement unit 60, compression stroke of the springs 61 can be varied (as shown in FIGS. 9 and 10) in order to accommodate different thicknesses of the wood workpiece 99 but still maintaining a predetermined level of pressure on the wood workpiece 99.

Figure 11:
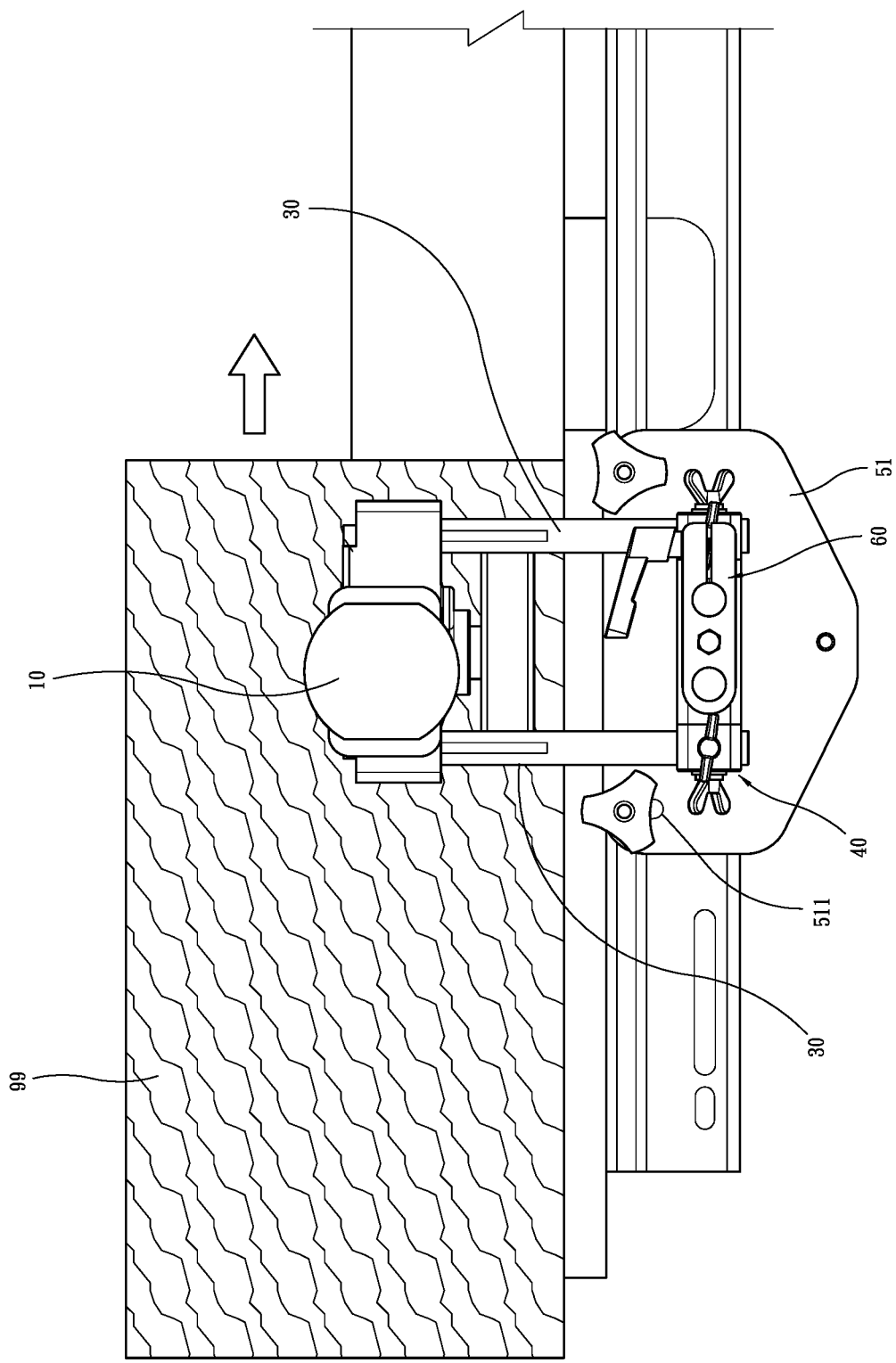
Figure 12:
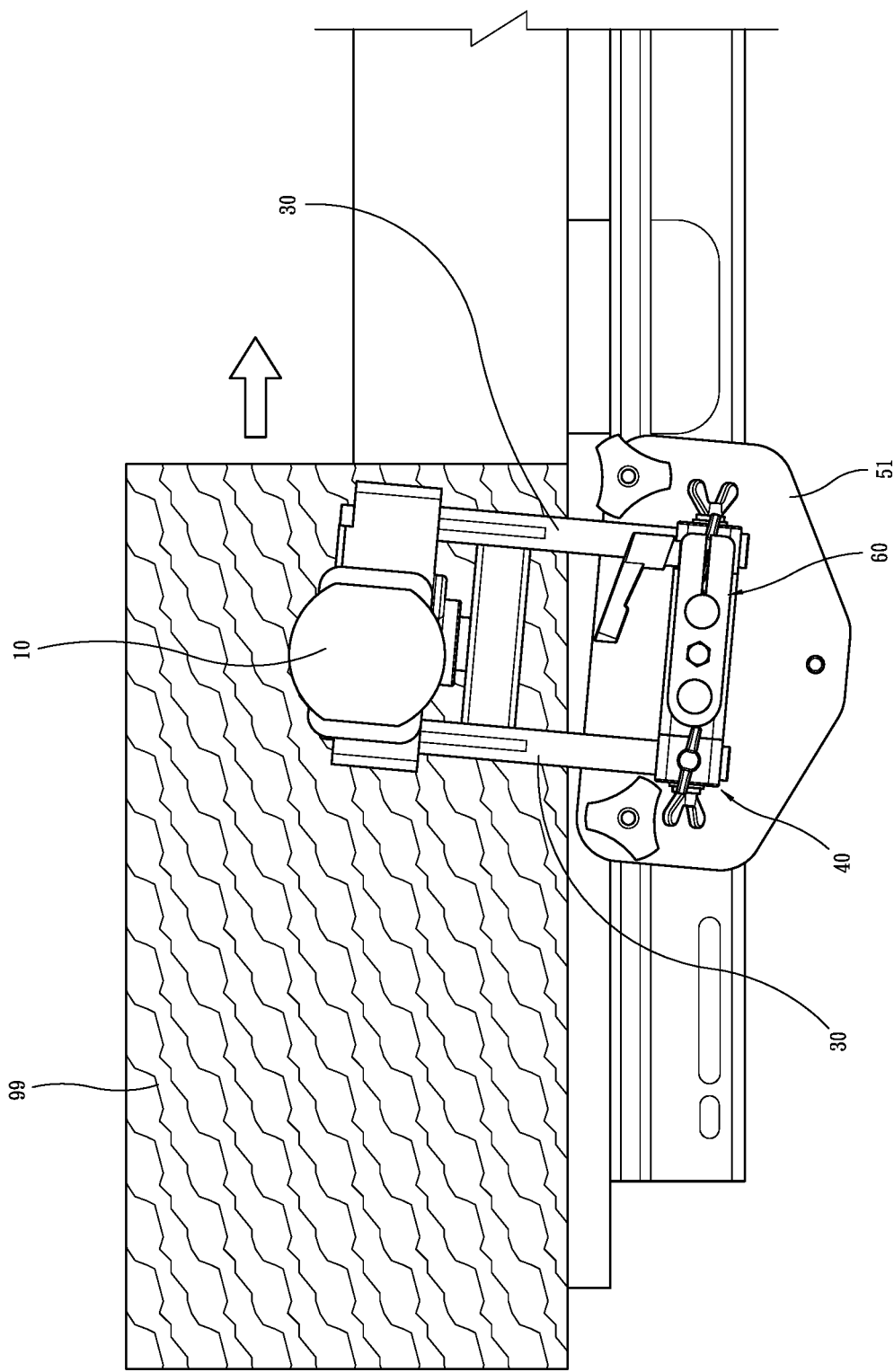

In the above embodiments, the base board 51 of the mounting base 50 can be structured such that one of the through openings 511 is an elongate linear hole or an oval hole (as shown in FIG. 11) to allow for adjustment of inclination of the base board 50 with respect to the wood-planing machine 91 in a horizontal direction (as shown in FIG. 12) to guide the wood workpiece 99 to approach the abutment board 911 during the movement thereof while maintaining an advancing movement along the abutment board 911 so as to make the size of the wood workpiece 99 cut with the machine consistent.

Thus, the present invention involves numerous structural designs for adjustment of angular positions and locations thereof and provides an overall structure that is sound and stable during the operation thereof so that the adaptability to wood workpieces of different materials and different thicknesses is improved and smoothness and security of material feeding can be ensured.

Figure 13:
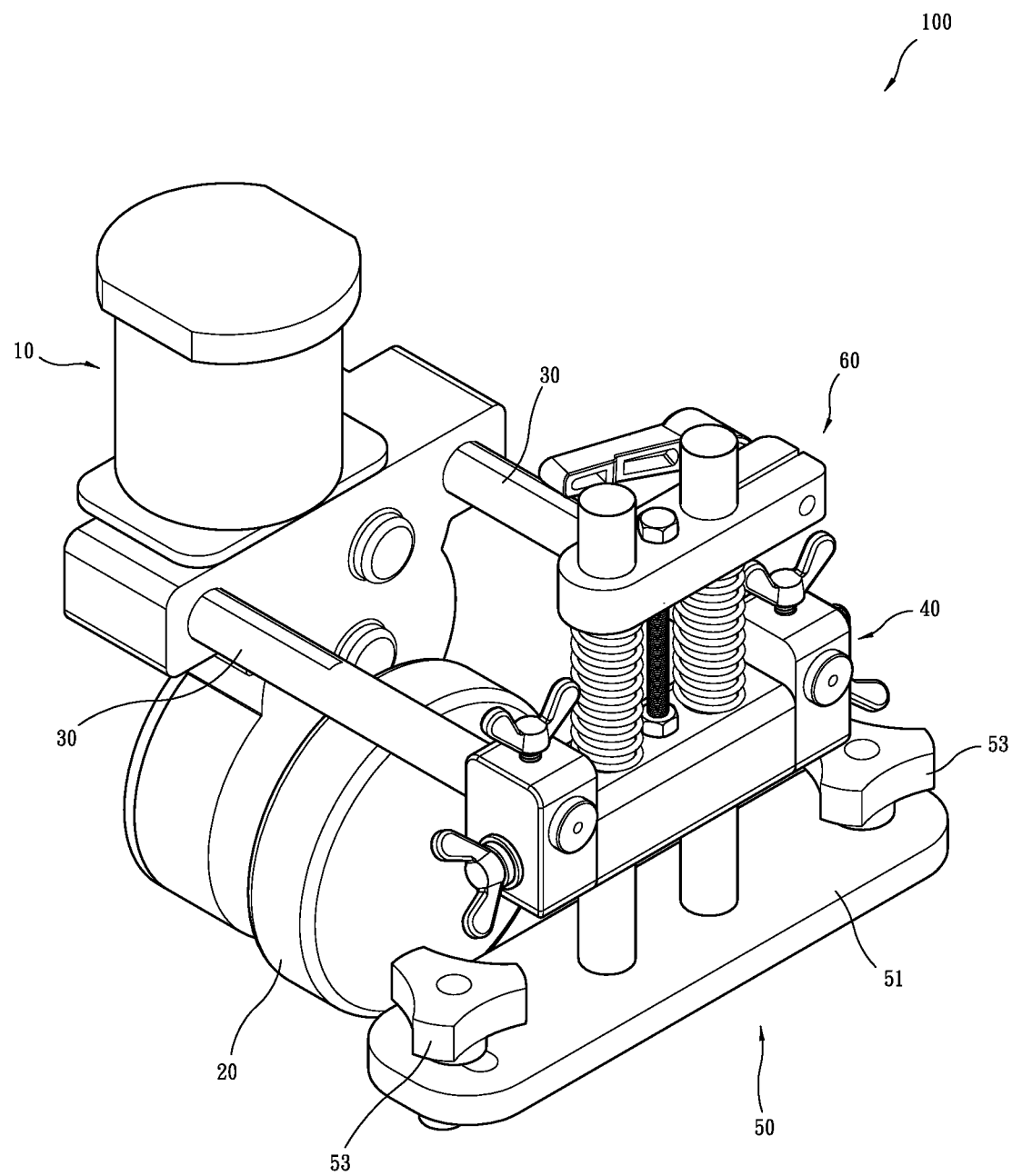
FIG. 13 is a perspective view showing another embodiment of the present invention in an assembled form.
Figure 14:
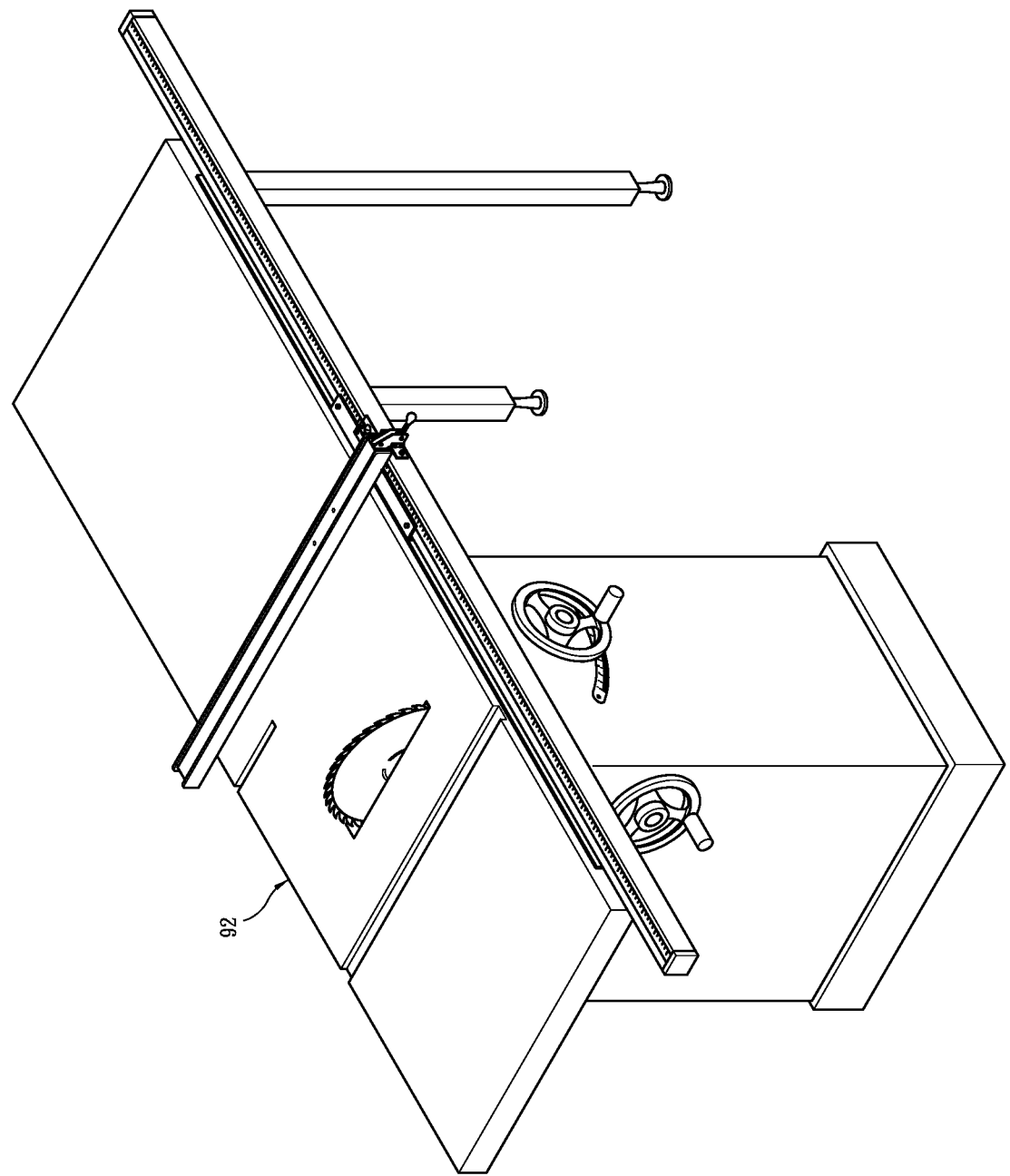
FIG. 14 is a perspective view showing a circular saw machine.

Next, as shown in FIG. 13, the base board 51 of the mounting base 50 can be structured in such a way that the support member is omitted so as to be installable and usable on a circular saw machine 92 (as shown in FIG. 14).

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the claims of the present invention.

I claim:
1. A power carpentry feeder machine, comprising:
a power source, which supplies rotation power;
a rotary wheel, which is coupled to the power source to be in operation in combination therewith;
two horizontal guide rods, are arranged in a manner of being spaced from each other to couple horizontally to the power base;
a horizontal movement unit, which comprises two movable blocks, two locking members, a connection block, and two jointing members, each of the movable blocks being provided with a horizontal guide hole penetrating therethrough, the horizontal guide holes of the movable blocks respectively receiving insertion and extension of the horizontal guide rods therethrough respectively, the two locking members being respectively and operatively attached to the movable blocks, the connection block being interposed between the two movable blocks, the connection block comprising two vertical guide holes penetrating therethrough, the two jointing members being respectively coupled to and jointing between the movable blocks and the connection block;
a mounting base, which comprises a base board and two vertical guide rods, the two vertical guide rods being arranged in a manner of being spaced from each other to vertically couple to a top surface of the base board and extending, in a direction from a bottom side to a top side, through the vertical guide holes of the horizontal movement unit; and
a vertical movement unit, which comprises two springs and a clamp block, the two springs being respectively fit over and encompassing the vertical guide rods of the mounting base such that the connection block is located under the springs, the clamp block comprising two clamping holes, the two clamping holes respectively receiving insertion and extension of the vertical guide rods therethrough so that the clamp block is located above the springs;
wherein the locking members are selectively releasable so that the horizontal guide holes of the movable blocks allows the power source and the rotary wheel and the horizontal guide rods to slide reciprocally along the horizontal guide holes in a horizontal direction; wherein the jointing members are selectively releasable so that the movable blocks are operable to drive the power source and the rotary wheel to rotate with respect to the connection block, and wherein the clamp block is selectively releasable so that the connection block is operable to drive the power source and the rotary wheel to slide reciprocally along the vertical guide rods in a vertical direction.

2. The power carpentry feeder machine according to claim 1, wherein the power source comprises a power base, a motor, and a gearbox, wherein the motor is mounted on the power base to provide the rotation power; the gearbox is mounted to the power base and coupled to the motor to reduce rotational speed of the rotation power for output; and the rotary wheel is coupled to the gearbox to be operable in unison therewith and the horizontal guide rods are coupled to the power base.

3. The power carpentry feeder machine according to claim 1, wherein the movable blocks of the horizontal movement unit are each provided with a threaded aperture extending from the top surface of the movable block to and in communication with the horizontal guide hole; and the two locking members are each a wing screw, which is set in threading engagement with a respective one of the threaded apertures.

4. The power carpentry feeder machine according to claim 1, wherein the horizontal movement unit further comprises two carrier rings; each of the movable blocks comprises a through hole penetrating from inside to outside thereof and a first counterbore formed along a circumference of an inside surface of the through hole; the connection block comprises two threaded holes respectively formed in two end surfaces thereof and two second counterbore each formed along a circumference of an end of a respective one of the threaded holes; the two carrier rings are respectively located in the second counterbores formed in the two ends of the connection block and the first counterbores of the respective movable blocks; the two jointing members are each a wing screw and are respectively received, from an outer side of each of the movable blocks, through the through holes and the carrier rings, to screw into the threaded holes formed in the two ends of the connection block.

5. The power carpentry feeder machine according to claim 1, wherein the mounting base further comprises a support member; and the base board comprises a threaded connection hole formed therein such that the support member is extendable in a direction from the bottom side to the top side to screw into and engage with the threaded connection hole of the base board.

6. The power carpentry feeder machine according to claim 1, wherein the mounting base further comprises two fixing members; the base board comprises two through openings formed therein such that the fixing members are received through the through openings respectively.

7. The power carpentry feeder machine according to claim 6, wherein at least one of the through openings is an elongate hole.

8. The power carpentry feeder machine according to claim 1, wherein the vertical movement unit further comprises a rotary handle; the clamp block further comprises a clamping slit extending into and in communication with one of the clamping holes and an adjustment threaded aperture extending through the clamping slit, wherein the rotary handle is in threading engagement with the adjustment threaded aperture for operation to tighten or loosen the clamping slit.

9. The power carpentry feeder machine according to claim 8, wherein the rotary handle comprises a threaded bar and a handgrip connected to the threaded bar, wherein the threaded bar is set in threading engagement with and received in the adjustment threaded aperture of the clamp block.

10. The power carpentry feeder machine according to claim 1, wherein the vertical movement unit further comprises a bolt and a nut; the connection block of the horizontal movement unit further comprises a position-constraining threaded aperture formed therein and located between the two vertical guide holes; the clamp block further comprises an adjustment aperture penetrating therethrough; the bolt is arranged to extend in a direction from the top side to the bottom side, through the adjustment aperture of the clamp block to further extend into the position-constraining threaded aperture of the connection block and the nut is in threading engagement with the bolt and is located between the connection block and the clamp block, wherein variation of a relative position of the nut with respect to the bolt allows for variation of a compression stroke of the springs.

* * * * *